US 007873675B2

(12) United States Patent
Richey et al.

(10) Patent No.: US 7,873,675 B2
(45) Date of Patent: Jan. 18, 2011

(54) SET-BASED DATA IMPORTATION INTO AN ENTERPRISE RESOURCE PLANNING SYSTEM

(75) Inventors: Jeffrey D. Richey, Woodinville, WA (US); Srikanth R. Avadhanam, Redmond, WA (US); Vladimir Y. Sergeyev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 185 days.

(21) Appl. No.: 11/378,829

(22) Filed: Mar. 17, 2006

(65) Prior Publication Data
US 2007/0220027 A1    Sep. 20, 2007

(51) Int. Cl.
G06F 17/30 (2006.01)
(52) U.S. Cl. .............................. 707/803; 706/45; 706/61
(58) Field of Classification Search .................. 707/1, 707/2, 3, 10, 100, 101, 104.1
See application file for complete search history.

(56) References Cited

U.S. PATENT DOCUMENTS

| 7,127,474 | B2* | 10/2006 | Williamson et al. ...... 707/103 R |
| 7,206,784 | B2* | 4/2007 | Gu et al. .................... 707/100 |
| 2004/0199537 | A1* | 10/2004 | Duff ........................... 707/102 |
| 2004/0215655 | A1* | 10/2004 | Rangadass .................. 707/102 |
| 2005/0222931 | A1* | 10/2005 | Mamou et al. ............... 705/35 |
| 2005/0246357 | A1* | 11/2005 | Geary et al. ................ 707/100 |

* cited by examiner

Primary Examiner—Apu M Mofiz
Assistant Examiner—Anteneh Girma
(74) Attorney, Agent, or Firm—Marshall, Gerstein & Borun LLP

(57) ABSTRACT

Importation of data records organized within tables from a source system to a target system while preserving relationships among data records of the tables when record identification values identifying each data record have been changed during importation includes, using the same database query on an entire table to update each record identification references that refers to a data record in another table.

19 Claims, 8 Drawing Sheets

SET-BASED DATA IMPORTATION INTO AN ENTERPRISE RESOURCE PLANNING SYSTEM

BACKGROUND

Importation of data is an important feature of any server-based product that manages data, including ERP systems. In particular, within enterprise resource planning systems that include relational database applications, there is often a need for the ERP application to support referential integrity. For example, one or more columns within a table may each refer to one or more columns in one or more other tables.

Each row within a table may include a unique identification value (e.g., record identification values) that uniquely distinguishes the row from other rows within the table. Data records may also use the record identification values of other data records to establish a referential relationship between the data records. The record identification values may be provided by maintaining a monotonically increasing counter for each record identification set. When a new unique record identification value is generated, the counter is incremented and the value is returned as the next record identification value.

However, during importation record identification conflicts may occur. For example, data imported from a different source may include record identification values that already exist in the target ERP system. Further, it is possible that record identification values may be lost or discarded, causing record identification fragmentation (e.g., gaps). The non-consecutive values resulting from fragmentation may be undesirable when directly copying the record identification values to the target system, because the record identification values corresponding to the gaps may not be regained, the number of available record identification values may be quickly exhausted.

To address record identification fragmentation, the record identification values of an import set may be replaced with a new set of record identification values in the target system. However, the integrity of data relationships should be maintained when replacing the record identification values. Although referential integrity may be maintained by processing each row individually and updating each record identification reference with the new record identification values, such a process may be inefficient.

When assigning new record identification values during importation to an ERP system, relational and referential integrity between and among data records within different tables should be maintained. Further, relational and referential integrity should be maintained within a set-based importation process, while maintaining efficiency with the importation process.

SUMMARY

New record identification values are assigned to data records of imported tables in a consecutive manner to remove fragmentation and account for row conflicts. Relationships between data records of different tables where relationships are referenced by record identification values may be maintained by updating record identification references in a set-based manner to refer to the new record identification values. Broadly, updating record identification references within a table may be accomplished using a database statement on the entire table, rather than modifying record identification references on a row-by-row basis. The use of the importation techniques maintains relational and referential integrity after importation when assigning new record identifications following importation to a target system, while providing an efficient importation process.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
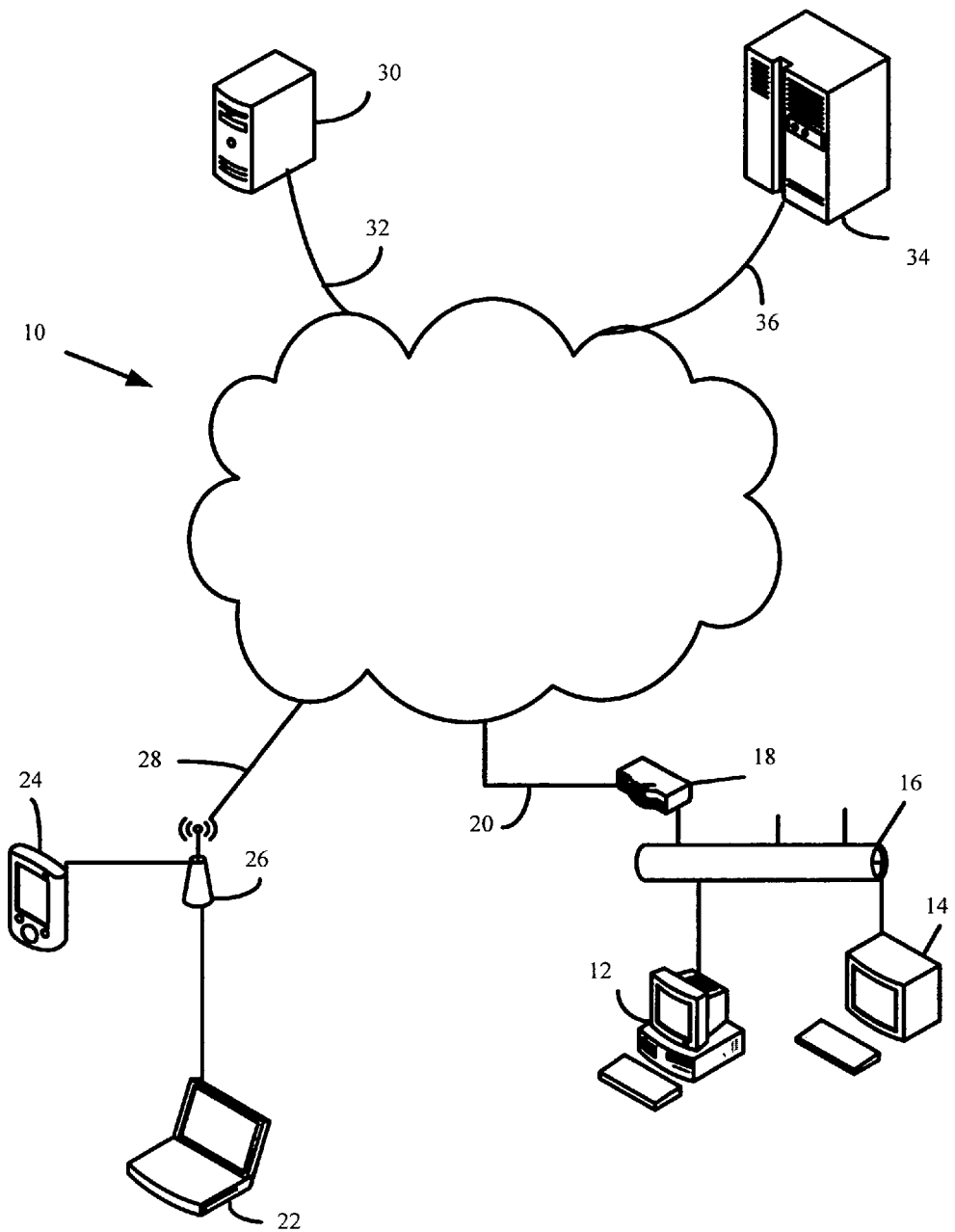
FIG. 1 is a simplified and representative block diagram of a computer network.
Figure 2:
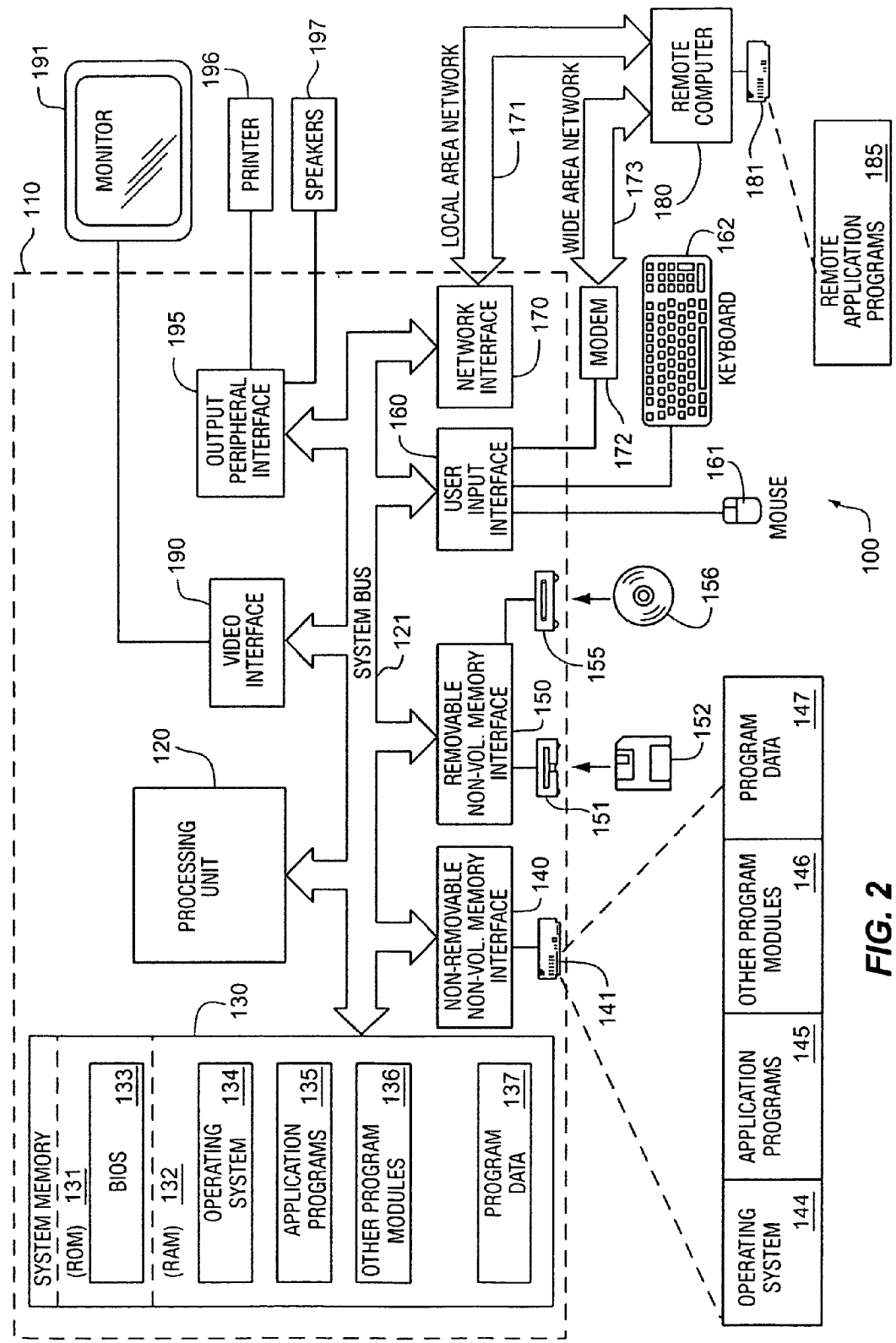
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
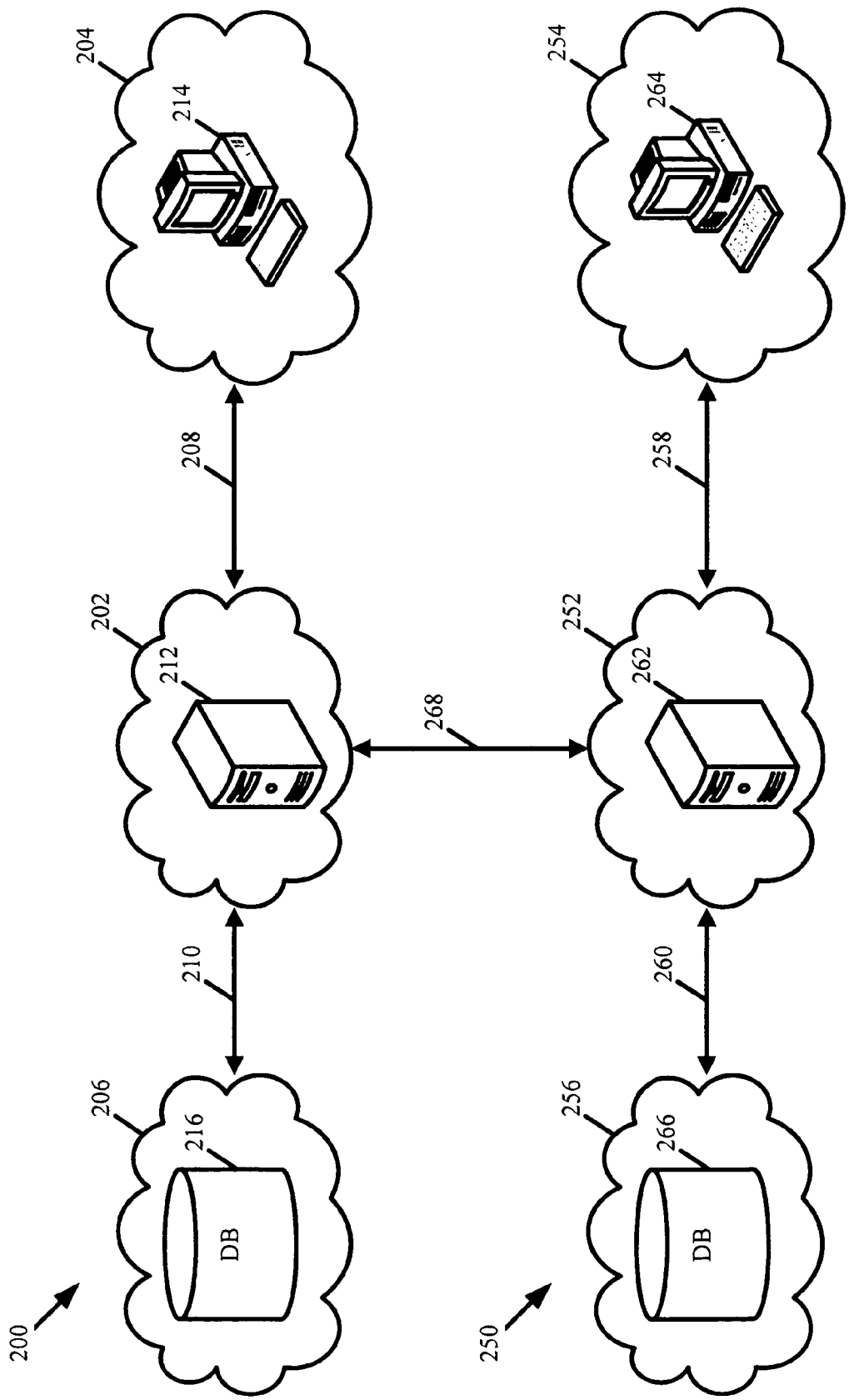
FIG. 3 is a representative block diagram of enterprise resource planning systems for importing data.

FIG. 3 may depict an enterprise resource planning (ERP) system, which may include a first installation 200 of an ERP system and a second installation 250 of an ERP system, each of which may be similar to or coupled to the network 10 of FIG. 1. The ERP system 200 may include individual systems 202, 204, 206 coupled by networks 208, 210. The networks 208, 210 may be wired or wireless may support Internet protocol version 6 (IPv6) and secure communications protocol, such as secured sockets layer (SSL). In one example, the Internet may be utilized as the networks 208, 210. System 202 is an application server system, which may be referred to as a middle tier and which may include one server 212 or multiple servers. The server system 202 may include a business enterprise server or a messaging and enterprise collaboration server, though different server types or server utilizations may be included.

Systems 204 is a client system that includes a network communication device 214, including, but not limited to, a personal computer, a telephone, a personal digital assistant, a set-top box, a television, an entertainment system, and the like. In one example, the client system 204 is a business system, which may be part of the same business enterprise as systems 202, 206. System 206 includes a database 216 operatively coupled to the server system 202, and which stores data records. In one example, the database 216 may store a data record within a row of a table with the data record contents organized within columns of the table, and the database 216 may maintain multiple tables to store data records. System 206 may further include an SQL or other relational database management server. The client system 204 may access data within the server system 202 and/or the database system 206 via the server system 202.

Likewise, the ERP system 250 may include individual systems 252, 254, 256 coupled by networks 258, 260. The ERP system 250 may be part of the same business enterprise as the ERP system 200. However, it should be understood that the system 250 may be any system or application which may be a source of data to be imported to the ERP system 200, as described further below.

As with networks, 208, 210, the networks 258, 260 may be wired or wireless, and may support Internet protocol version 6 (IPv6) and secure communications protocol, such as secured sockets layer (SSL). In one example, the Internet may be utilized as the networks 258, 260. System 252 is a server system which may include one server 262 or multiple servers, and may include a business enterprise server, an SQL or other relational database management server, or a messaging and enterprise collaboration server, though different server types or server utilizations may be included. Systems 254 is a client system that includes a network communication device 264, and the client system 204 may be a business system, which may be part of the same business enterprise as systems 252, 256. System 256 includes a database 266 operatively coupled to the server system 252, and which may store data records within rows of tables as with the database 216. The ERP system 250 may be coupled to the ERP system 200 via a network 268, which may be wired or wireless, may support Internet protocol version 6 (IPv6) and secure communications protocol, and which may be the Internet. The client system 254 may access data within the server system 252 and/or the database system 256 via the server system 252.

Importation of the data records may be managed by the various systems of the target ERP system. In one example, the ERP system 250 may include data records for importation to the other ERP system 200. For instance, the database 266 and/or server 262 may maintain data records within source tables to be imported into target tables of the ERP system 200. Generally, the server systems 202, 252 may facilitate the importation of data between and among the various ERP systems 200, 250. For example, importation from a source ERP system 250 to a target ERP system 200 may include exporting data into an import file on the source ERP system 250, copying the import file to a client system 204 on the target ERP system 200 and initiating the data import process from the client system 204.

Although the client systems 204, 254 are each shown to include one network communication device 214, 264, it should be understood that different numbers of network communication devices may be utilized. Likewise, the server systems 202, 252 may include different numbers of servers, and the database systems 206, 256 may include different numbers of databases. Further, while the servers 212, 262, the network communication devices 214, 264 and the databases 216, 266 are each shown to be provided within their own systems 202, 204, 206, 252, 254, 256, it should be understood that the server 212, the network communication device 214 and/or the database 216 may be provided within the same system, and, in some cases, on the same computer. Likewise, the server 262, the network communication device 264 and the database 268 may be provided within the same system and even on the same computer. It should also be understood that multiple systems may be provided, including hundreds or thousands of client systems and database systems. Although the following disclosure generally describes data importation between a source ERP system 250 and a target ERP system

200, it should be understood that each ERP system 200, 250 may include multiple simultaneous importation processes involving multiple sources and/or multiple targets initiated by different client systems. Various examples of computer code are provided below, some of which are written in X++ programming language, which is a simple object-oriented language, although various other programming languages, including other object-oriented languages or metalanguages, may be utilized. In addition, while various examples of statements or queries are provided as structured query language (SQL) statements, which is a database management and/or object database management language which may be used to create, modify and retrieve data, other languages which support database queries and database statements may be utilized.

As mentioned, the data records may be stored within tables, which generally includes multiple rows and multiple columns. In particular, each data record may be stored within a row of a table, and each data record organized among different columns. Each data record may be associated with a record identification, which uniquely identifies the data record among all the other data records within the table and or the database. Accordingly, each table may be provided with a record identification column related to the record identifications (e.g., RecID), and each data record may be assigned a unique record identification.

Within an ERP system, data records within a table may refer to other data records within another table. For example, if the ERP system 250 is used to manage customers and sales orders, a first table may include data records relating to information about each customer (e.g., name, social security number, etc.) and a second table may include data records relating to sales orders. In order to relate Customer A listed within a customer table to Customer A's sales orders within a sales order table, a data record related to Customer A's sales orders may include a record identification reference which refers to the record identification of the data record associated with Customer A within the first table. In some cases, a data record may refer to multiple data records within one or more tables. Thus, each table may be provided with one or more columns related to the record identification reference(s) (e.g., RefRecID), which uniquely identifies data records within other tables by referencing the record identification of the data record(s) of the other table(s). In particular, a first data record may include the record identification of a second data record within the record identification reference column to relate the first data record to the second data record.

In still further cases, multiple data records within a table may refer to data records in multiple different tables. In the example above, if the ERP system 250 relates to customer sales and orders, a preferred customer table may be provided in addition to the customer table and the sales order table. The preferred customer table may maintain a list of preferred customers from among the customers listed within the first table. A sales order within the sales order table may relate to a customer listed within the customer table and also to a preferred customer listed within the preferred customer table. However, record identification references and record identifications alone may not be sufficient to identify the particular table being referred to by a particular data record (e.g., a sales order). For example, the preferred customer table may identify each preferred customer using the same record identification as used to identify the customer in the customer table. As such, each table may be provided with a column related to a table identification (e.g., TableID), which uniquely identifies another table within the system, and any data record may uniquely identify which table and row is being referred to by utilizing the record identification reference, RefRecID, and the table identification, TableID. The use of the record identification reference and the table identification reference may allow any data record to potentially refer to any data records within any number of tables.

As an alternative to a table identification, a relationship type may be provided. In particular, a relationship type may uniquely identify the type of relationship involved between data records such that the type of relationship identified within a data record (e.g., "Type 1" refers to a preferred customer sales order) is interpreted as referring to a particular table (e.g. preferred customers table) which has a particular table identification. A table may be provided with a relationship type column such that each data record may include a relationship type value.

Figure 4:
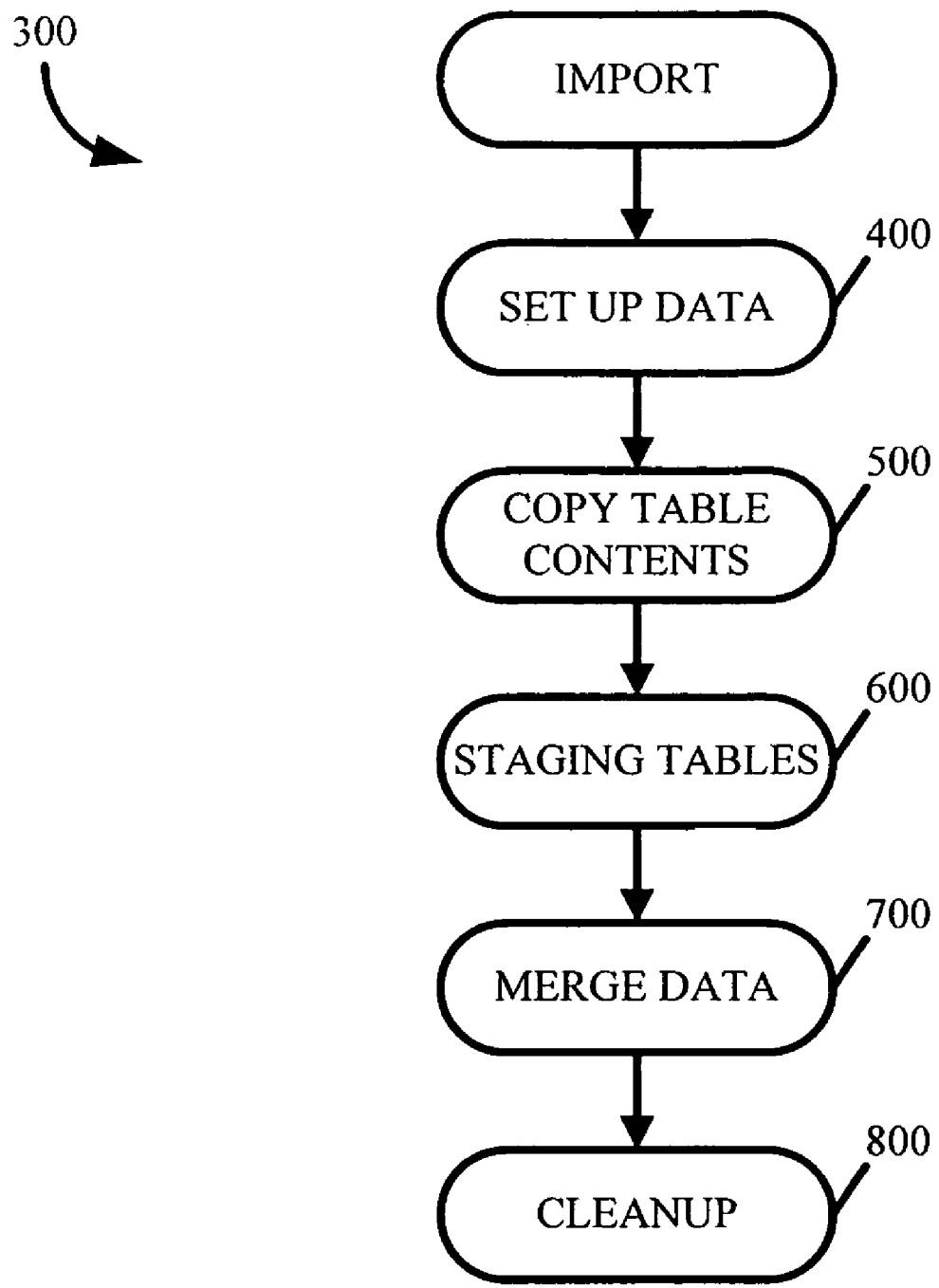
FIG. 4 is a flowchart representative of a routine for set-based data importation.

FIG. 4 is an example of a set-based data importation routine 300 which may be executed by the ERP system 200, to import data from a source, such as the ERP system 250, to a target ERP system 200. In particular, an import file contains data to be imported. The import file may be created on the source ERP system 250, although as mentioned above different importation sources may be provided including different systems and/or applications. The import file may be provided via the network 268, by physical transfer of a computer readable medium or any other manner of providing data to the target system. The importation process may be initiated by the client system 204, and the importation process may transfer imported data to the server system 202 and ultimately to the database system 206.

Using the importation process described herein, data records within source tables may be copied or replicated to tables within the target ERP system, in a set-based manner. Generally, FIG. 4 may be a series of logical phases for importing data records from a source ERP system to a target ERP system, where imported data may be provided in an import file, such as a .DAT file, created in the source ERP system, assigning new record identification values for the data records, and determining and marking record identification conflicts while preserving relationships between data records and tables.

As will be explained further below, the importation of data records may result in replacing record identifications of the import table with new record identification values to avoid conflicts with existing record identification values within the target ERP system. In one example, the importation of data records may undergo record identification compression to remove fragmented record identifications. In other words, data records imported from a source ERP system having fragmented (e.g., non-sequential) record identifications undergo record identification compression to map the fragmented record identification values into a consecutive set of new record identification values. For example, a range or set of noncontiguous or fragmented record identification values (e.g., 056, 208, 378, 379) within the imported set are replaced with new record identification values to produce a range or set of contiguous record identification values (e.g., 101, 102, 103, 104) within the target table. In addition to addressing fragmentation, compression of record identification values may be used to avoid record identification conflicts between record identifications of imported data records and record identifications of existing data records in the target ERP system.

In order to differentiate record identification conflicts from row conflicts (e.g., imported data records that correspond to, or conflicts with, existing data records within the target ERP system), imported data records may be compared to existing data records in the target ERP system based upon unique, consistent values within the data record itself. For example, in a customer table, a customer name and/or social security number may be considered as values that are unlikely to change and are unique among customer data records. An imported customer table may include a data record for Customer A, and an existing customer table in the target ERP system may also include a data record for Customer A. However, prior to compression, the data records may use different record identifications. Accordingly, the names and/or social security numbers within both customer tables may be compared to determine the row conflict resulting from the Customer A data record. The customer table in the target ERP system may be used as the target table for the imported data. The conflicting imported Customer A data records may be assigned the record identification of the existing Customer A data record, and the existing Customer A data record may be either updated/replaced with the imported Customer A data record. Alternatively, the conflicting imported Customer A may be ignored. Record identifications of conflicting rows may be re-assigned based upon user preferences for updating the existing data records. Imported data records that do not have a corresponding data record that exists in the target table (e.g., non-conflicting rows) may be appended to the target table.

In the case of either record identification compression or row conflicts, the importation process described herein preserves relationships between the record identification reference values and the corresponding record identification values, despite the potential transformation of the record identification values and despite the number of record identification values and table identification values to which a data record may refer via the record identification references.

Referring to FIG. 4, beginning at block 400, the set-based import process 300 may include a set up data routine 400 for setting up the source data for tracking the import process. During the set up data routine 400, for each import table within the import set, the import process 300 may populate tables within the server system 202 with general information about the import session that is about to be started and establish data importation options, such as options regarding conflicting rows. In one example, the general information may include table(s) that list all currently active import operations, SysImpExpSessionInfo, and table(s) that list the tables that are being imported by the current import operation and their current state, SysImpExpTablesInfo. Some of the import session information may be read from the import file by the application logic of the import process and passed to the server system 202.

Columns within an active import operations table, SysImpExpSessionInfo, may include, but are not limited to, a column containing the name of the import file (SysImpExpSessionInfo.FileName), a column containing a unique identifier of the client providing the import file (SysImpExpSessionInfo.ClientUID), a column containing a unique identifier for the import session (SysImpExpSessionInfo.ImportPrefix), a column containing a user choice regarding conflicting rows, (SysImpExpSessionInfo.UpdateConflictingRows) and a column containing the number of rows that were not inserted into the target table due to row conflicts (SysImpExpSessionInfo.ConflictedRows), Columns within a table, SysImpExpTablesInfo, may include, but are not limited to, a column containing the table identification of the imported table specified in the import file (SysImpExpTablesInfo.TableID), a column containing the name of the table in the import set (SysImpExpTablesInfo.TableName), a column containing a unique prefix used to assign names to a temporary staging table corresponding to the imported table (SysImpExpTablesInfo.TableNamePrefix), a column containing the first record identification value that will be assigned to data records of a table from the imported set (SysImpExpTablesInfo.ImportStartRecID), a column containing the number of rows imported for a table (SysImpExpTablesInfo.ImportRows), and a column containing the current state of a table in the import process (SysImpExpTablesInfo.State). Current states may include, but are not limited to, an importation process not started, data imported to a temporary staging table, a temporary staging table updated with information about row conflicts, non-conflicting rows having undergone record identification compression in the temporary staging table, and data having been merged from the temporary staging table into the target table.

Additional tables maintained by the server system 202 may include, but are not limited to, a table containing actual table data that will be imported (TableData), a table containing information about columns in the imported table including special-purpose columns such as pseudo-columns, record identification columns, the record identification columns, etc. (TableColumns), a table containing information about all conflicts that occur during the import process (ImportConflicts), a table containing the names of table identification columns that correspond to each record identification reference columns in the import set (RefRecIDColMap), a table containing mapping between noncontiguous, fragmented record identification values and new compressed record identifications values for a table (CompressionMap), and a table containing results all of SQL join queries (described below) for an import table that may be used for updating conflicting data records and inserting new data records into a target table (SavedJoinResultsView). The SavedJoinResultsView table may be provided as a database view (saved query results) and may be referred to as a resolution view.

At block 500, the import routine 300 may include a copy table contents routine 500 to read imported data from the import file, extract data for the imported table, add metadata from metadata storage to the data being imported which may be extracted from the metadata storage on the server system 202, copy the contents of an import table and metadata from the import file, including any additional data from the set up data routine 400, to the target ERP system. The combined imported data and metadata may be copied to temporary staging tables in the target ERP system. Examples of information extracted from metadata and passed to the server system 202 may include table identifications that correspond to each record identification reference.

The copy table contents routine 500 may be implemented partially in the application logic of the import process and partially in the server system 202. In particular, the copy table contents routine 500 may read data about the schema of the imported table and pass the schema data to the server system 202. The application logic checks to see if the imported table already exists in the target ERP system. Further, the copy table contents routine 500 may find all record identification reference columns and determine if there is a corresponding table identification column for each record identification reference column. Data from each imported row may be read and passed to the server system 202, and the data copy may be completed for the current table allowing the copy table contents routine 500 to move to the next table being imported.

At block 600, the import routine 300 may include a staging tables processing routine 600 for processing data in temporary staging tables. In particular, the staging tables processing routine 600 may be used to detect and delete duplicate records, and to determine and mark row conflicts between the imported and existing data. The staging tables processing routine 600 may further be used to compress the record identification values of the imported table.

At block 700, the import routine 300 may include a merge data routine 700 for merging the data from the temporary staging tables or resolution views into the target ERP system. In particular, after the temporary staging tables have been processed from the staging tables processing routine 600, the imported data may be either merged directly into the target tables if no referential relationships exist involving record identification columns or process further into the resolution view which may be provided as a source of imported data for the target table. The creation of a resolution view in addition to a temporary staging table may be used to fix referential relationships for a particular temporary staging table. However, in some cases the creation of a resolution view may not be used, even for table with record identification references. As explained further below, the results of join operations may be provided in a resolution view before inserting and updating data into the target tables. The merge data routine 700 may depend on the user choice regarding conflicting rows, SysImpExpSessionInfo.UpdateConflictingRows, mentioned above.

A block 800, the import routine 300 may include a cleanup routine 800 once the import process is complete, all staging tables may be dropped and any row describing the import session may be removed from the active import operations table, SysImpExpSessionInfo.

It is noted that before the importation process starts for a new importation session, the importation process may check whether the same importation session (e.g., an importation session trying to import data from the same import file and an importation session initiated from the same computer) is already in progress or was previously started, but not completed. In particular, the importation process may search for the record that describes current importation process in the table SysImpExpSessionInfo. If the record is found, the ERP system may check a timestamp value on that record. The timestamp may be provided as a column updated regularly during the importation process to indicate that the importation process is alive. If the timestamp is valid (e.g., within a certain configurable time period) then the current import operation is already in progress and an error message may be generated. If the timestamp is invalid, then the previous attempt to import the current import file was not successful, in which case the results of previous attempt may be rolled back and the import operation may be started from scratch, or the attempt may continue from where previous import attempt have stopped.

In addition the server system 202 may commit the import session information, which may include checking to see if the active imports operations table, SysImpExpSessionInfo, exists in the target ERP system. If so, the server system 202 may check to see if the active imports operations table contains information about the import process that is currently being performed (e.g., file name, client MAC address, etc.). If the information is present, then the import operation is already in progress or a recovery of an existing import process was not completed, in which case the server system 202 may return an error. If the active imports operation table does not exist, or does not contain information about the current import process, the server system 202 may generate a unique name suffix and save the suffix in the unique import session identifier column, SysImpExpSessionInfo.ImportSuffix, and begin the transaction.

If the current importation operation is not already in progress and there were no previous partially-completed attempts to import the same data, the import process may generate a unique name suffix which may serve as a "name handle" for the current import session and may further be used as a name suffix for all temporary staging tables that will be created during the current import session. The name suffix along with other data that describes the import session may be added as part of a new row in the table SysImpExpSessionInfo which describes all currently active or aborted import sessions in the target ERP system 200.

Figure 5:
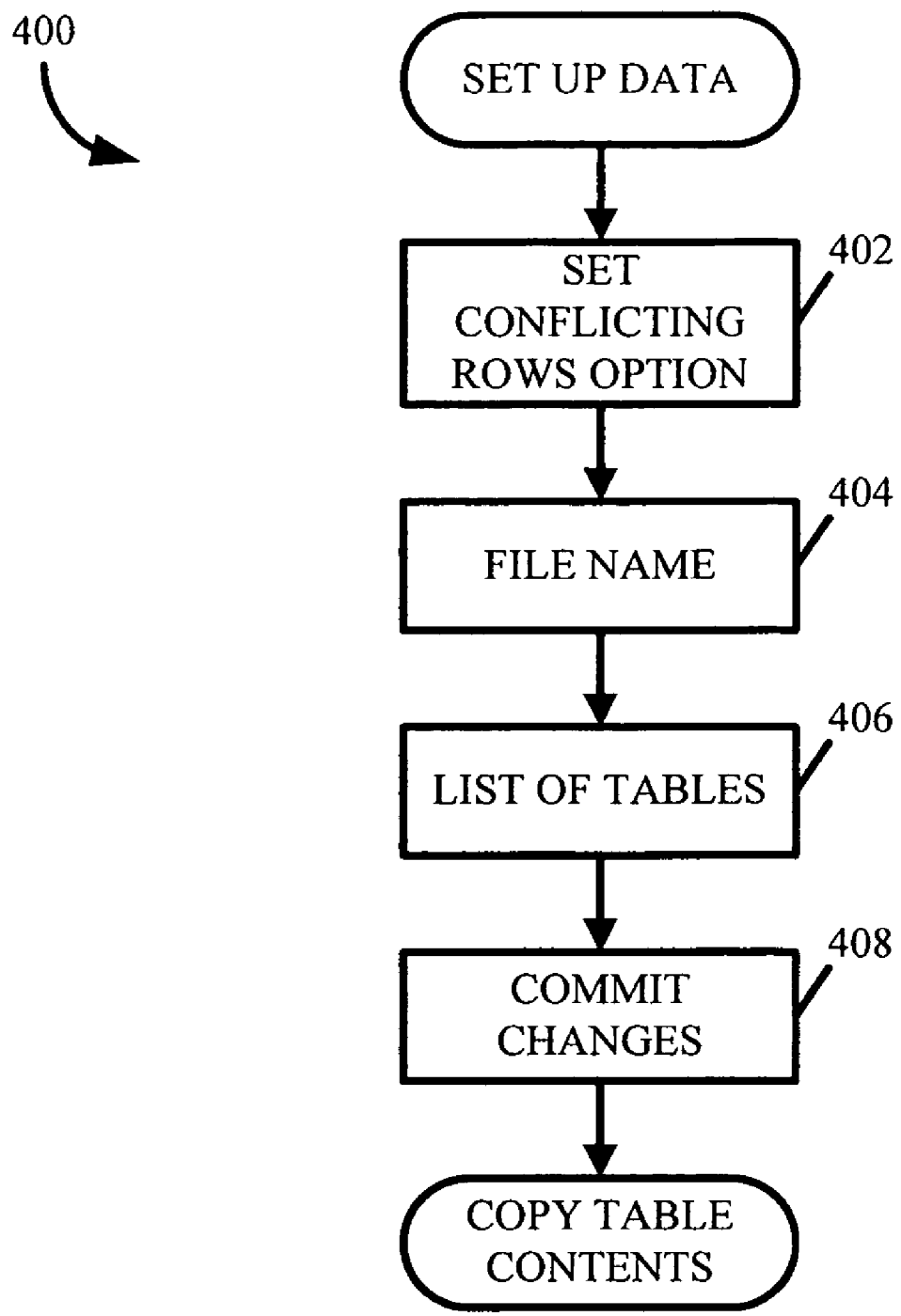
FIG. 5 is a flowchart representative of a routine for setting up data to be imported.

FIG. 5 is an example of a set up data routine 400 shown schematically in FIG. 4. As mentioned above, the set up data routine 400 may set up the source data for tracking the import process. The set up data routine 400 may be executed on various tiers of the target ERP system 200, including, but not limited to, the client systems 204 or the server system 202. Although the following depicts establishing importation options followed by the passing the file name, it should be understood that FIG. 5 presents a system perspective of the set up data routine. From a user perspective, the user may initially specify a file name for the import file and then provide user options regarding the importation process.

Beginning at block 402, the set up data routine 400 may set various importation options including the conflicting rows option for dealing with any record identification conflicts that may be determined during the staging tables processing routine 600. The conflicting rows option represents a user's choice regarding whether an imported row should be rejected if the imported row conflicts with the existing row or if the existing row should be updated with the data of the imported row if a row conflict occurs. For example, SysImpExpSessionInfo.UpdateConflictingRows may be set to "false" if the user decides to reject all conflicting rows, and may be set to "true" if the user decides to update existing rows with imported data. The import process application logic may therefore prompt a user to provide a conflicting rows option prior to the import process.

At block 404, the set up data routine 400 passes the import file name that is being imported to the server system 202. The import file name may be passed to the server system 202 by calling a start data import schema, StartDataImport( ), a partial example of which is shown below. It is noted that an ERP system may be provided as a generic platform and may expose a metalanguage which may be used to add logic to the ERP system which, for example, may be specific to a particular business model. For example, application logic may be written in a metalanguage. The system or kernel logic may be logic that is part of the ERP platform. As such, the example provided below is provided in X++, though it should be understood that other programming languages, including other metalanguages, may be utilized. In the example shown below, the second argument to the StartDataImport( ) indicates the conflicting rows option established at block 402, and the StartDataImport( ) schema returns an instance of a DataImportSessionInfo class that may be used start the importation of a table and to pass the data about the imported tables to the server system 202.

---

```
...
// start import session
DataImportSessionInfo importSessionInfo =
        new DataImportInfo("D:\Data\Import.DAT", false);
// add information about tables that are going to be imported
importSessionInfo.AddImportTable("Table1", 152);
importSessionInfo.AddImportTable("Table2", 153);
importSessionInfo.AddImportTable("Cust", 20);
...
// commit import session info
DataImportManager::CommitImportSessionInfo(importSessionInfo);
```

---

At block 406, the set up data routine 400 may provide a list of tables are going to be imported. The list of tables may be provided by calling an AddImportTable( ) on the DataImportSessionInfo instance from block 404. For each table, the name of the table and the table identification from the import file may be specified. Although not depicted, the application logic may detect whether the imported table has a corresponding target table that exists in the target ERP system. If a target tables does not exist in the target ERP system the application logic may report an error to the user that the target table does not exist and the table may not be imported or, alternatively, the table may be created manually. The application logic may also check if the table being imported has a different table identification than the target table in the target ERP system. If the table identification is different, no data may be passed to the server system 202, an error may be reported, a user may be prompted with the option to use existing table identification, etc. depending on the particular implementation of the importation process.

At block 408, the set up data routine 400 may pass control to the import process logic to extract metadata for tables being imported, and copy the imported data and extracted metadata to the temporary staging tables.

Although the set up data routine 400 describes steps performed by the import process application which may be executed throughout the target ERP system 200, the server system 202 may perform steps corresponding to those provided above. For example, the server system 202 may save the name of the imported file and the client machine MAC address in the DataImportSessionInfo instance, and return the instance to the client. The server system 202 may further add information about a table from the import set to the DataImportSessionInfo instance.

The server system 202 may create an active imports operations table, SysImpExpSessionInfo, in the target ERP system if one does not already exist, and/or add a row to the active imports operations table containing the name of the import file, the client machine MAC address, the unique name suffix which uniquely identifies the import session, and the update conflicting rows option.

With reference to the X++programming example of the StartDataImport( ) schema shown above, the server system 202 may perform the following in response to each of the method calls provided therein. For example, in response to DataImportInfor::.ctor( ), the server system 202 may save the name of the imported file and client MAC address in the DataImportSessionInfo instance and return that instance to the client.

In response to AddImportTable( ), the server system 202 may add information about one table from the import set to the DataImportSessionInfo instance.

In response to CommitImportSessionInfo( ), the server system 202 may perform a call to SvrCommitImportSession( ), which checks if the active import operations table, SysImpExpSessionInfo, exists in the target ERP system, and if so, determines if it contains the information about the import session being performed. As mentioned above, if the information is present, the import operation is already in progress or recovery did not complete, and an error code may be returned. Otherwise, a unique name suffix is generated for the current importation session. SvrCommitImportSession( ) further begins the transaction, creates a SysImpExpSessionInfo table in the ERP system if not yet created, adds a row to the SysImpExpSessionInfo table containing information as mentioned above, creates a SysImpExpTablesInfo<uid> where uid is a unique name suffix generated for the import session, adds a row for each imported table from the import file containing the information mentioned above, and commits.

Figure 6:
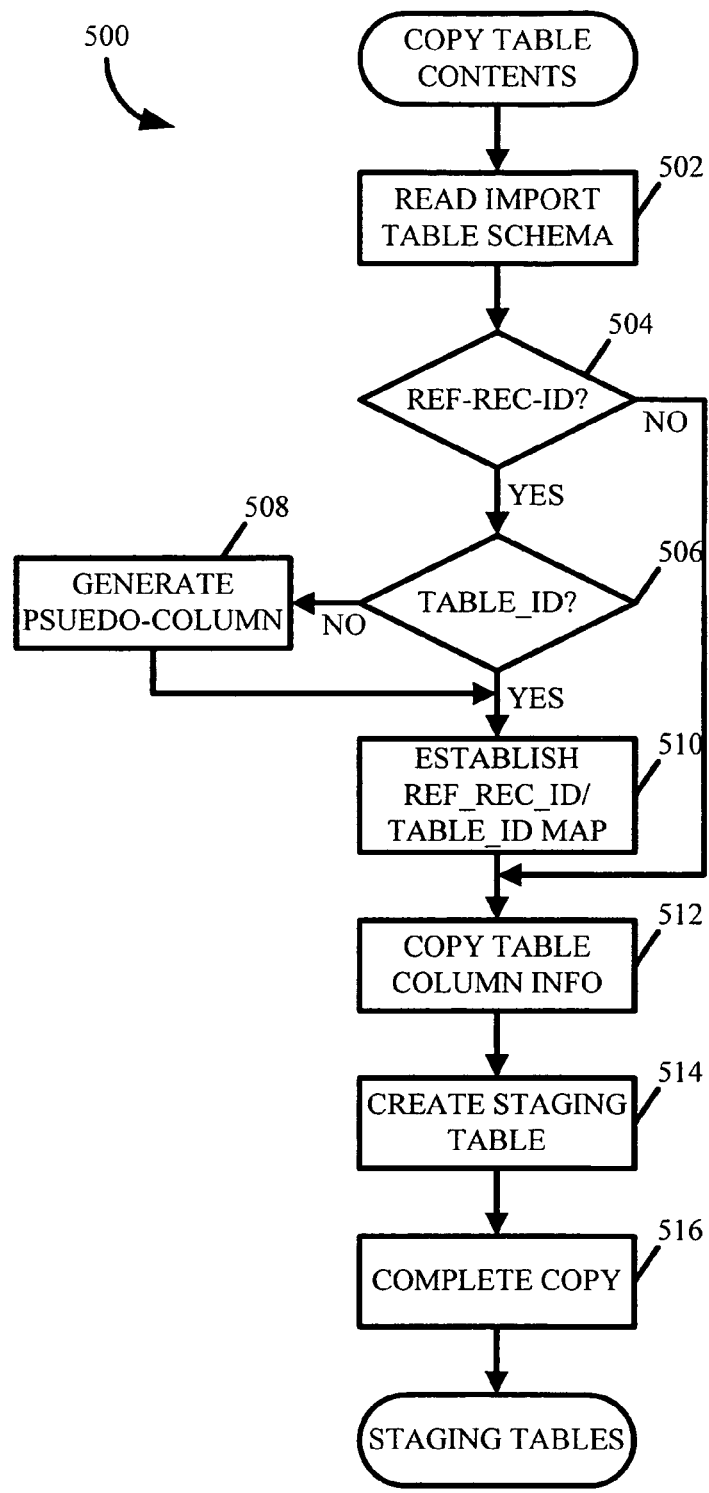
FIG. 6 a flowchart representative of a routine for copying table contents and adding metadata to the imported data.

FIG. 6 is an example of the copy table contents routine 500 shown schematically in FIG. 4. As mentioned above, the copy table contents routine 500 copies table contents and metadata for the imported table from the import file and/or from metadata storage into the target ERP system. The copy table contents routine 500 may be performed for each table being imported. The table contents may be copied using a bulk copy in order to maximize performance. Although the copy table contents routine 500 shown schematically in FIG. 4 may be implemented partially in the import process application logic and partially in the server system 202, the example shown in FIG. 6 relates primarily to the process as performed by the application logic.

Beginning at block 502, for each table, the application may read the data about the schema of the imported table, and pass the data to the server system 202. Further, it may be determined whether the table has any equality criteria columns, an explanation of which is provided further below. In particular, the application logic may check whether the table being imported already exists in the target ERP system as a target table. If it does, the application logic may check whether the target table has a different number of columns than the imported table. For example, if the target table has less columns than the imported table, then only columns, and corresponding values, in the imported table that correspond with columns in the target table are passed to the server system 202, and columns within the import set that do not exist in the target table are excluded. On the other hand, if the target table has more columns than the imported table, then missing columns from the imported table may be added to the imported table with default values for each imported row. If any columns within the table constitute unique indexes, such columns may be marked and persisted as equality criteria columns. If the target table does not exist, an error may be generated and a separate process may be established to create a target table.

Equality criteria columns are columns that may be used for detecting row conflicts to determine if the row from the import table already exists in the target table. The equality criteria columns may contain or constitute data that is unique among rows and tables and are unlikely to change. A table within the import set or in the target ERP system may have one or several equality criteria columns. These columns may form unique indexes on the tables being imported. Unique indexes are distinct from record identifications, even though record identifications may be used to uniquely identify the data record, so that row conflicts may be detected independently from record identification conflicts. In other words, the equality criteria columns may be used to differentiate between whether the conflict is the result of the same record identification values for different data records, or the result of the an existing data record. Accordingly, equality criteria columns are considered separately from record identification columns. Columns containing unique indexes may be identified by examining the metadata of the imported table, and may be used as equality criteria columns for the table during the import process. As explained further below, equality criteria columns of imported tables and existing tables may be compared to identify rows that describe the same data, thereby indicating conflicting rows. For example, as mentioned above, a customer name and/or social security number may be used as equality criteria columns within a customer table because such data is generally unique to the data record and unlikely to change.

In some cases, all the columns of an imported table make up unique indexes, except for the record identification column. For example, if two columns within an imported table are considered to be equality criteria, then a row in the target table is considered equivalent to a row in the imported table.

If the imported table does not have any unique indexes, then no columns may be marked as equality criteria.

At block 504, the copy table contents routine 500 may determine whether there are any record identification reference columns in the imported table, in which case, at block 506 the routine 500 may determine if there is a table identification column that corresponds to each record identification reference column. Otherwise, the copy table contents routine 500 may proceed to copy table column information to the target ERP system.

If the imported table does not contain a table identification column corresponding to the record identification reference column, the copy table contents routine 500 may generate a unique column name for a pseudo-column at block 508, which will be used to refer to the table identification data to be extracted, and pass the table identification data that corresponds to the record identification reference column which does not have a matching table identification column. The pseudo-columns may be used to pass the data as if the data was a part of the imported table. For all new table identification pseudo-columns, and existing table identification columns, the routine 500 may establish a map between the name of each record identification reference column and corresponding table identification column at block 510.

On the other hand, referring back to block 506, if the imported table already has a table identification column that corresponds to the record identification reference column, data for the table identification columns may be extracted for each record identification reference column. A mapping may be established between the record identification reference column and the corresponding table identification column based on the information from the table metadata as indicated at block 510. The data may be copied without performing any special handling directly from the import file at block 512. It is noted, however, that if the imported table does not have a table identification column, but stores the table identification values elsewhere, such as in the metadata, the import process application may find and extract that data and provide it with the data for the row in a pseudo-column that corresponds to the record identification reference column.

At block 512, the copy table contents routine 500 may copy information about all columns of the imported table, including pseudo-columns. A distinction may be made between regular columns or columns that have a special meaning. For example, columns with a special meaning include, but are not limited to, pseudo-columns, record identification columns, record identification reference columns and equality criteria columns. As explained above, pseudo-columns or columns that do not exist on the imported table may only be used to pass the table identification data for the record identification reference column that does not have corresponding table identification column in the imported table.

Once the schema information about all columns in the table have been copied at block 512, and relationships between all record identification reference columns and table identification columns, including pseudo-columns, have been established, temporary staging tables are created at block 514. At block 516, the copy table contents routine 500 may complete the copy operation by copying the data contained within the rows from the import file into the temporary staging tables, including any data obtained from the copy data routine 500.

In some cases, the columns of the imported table may not have column types (e.g., variable character, integer, etc.) that match the column types of the corresponding columns in the target table, even if the columns have the same name. In still further cases, the imported values may fall outside the valid range of the target columns or other aspects may violate table constraints of the target table, and which may cause errors when the temporary staging table is merged with the target table. For example, a column of the imported table may match the column name of the target table, but does not match the column type and/or the imported values fall outside the valid range of the columns of the target table. In order to address invalid data within an imported table, the copy table contents routine 500 may further reject any rows that violate table constraints of the target table. In particular, the temporary staging table created at block 514 has the same schema as the target table. As such, at block 516, any rows that violate the data types or ranges of the temporary staging table, and hence the target table, may be rejected by the database system 206. Invalid rows are rejected on an row-by-row basis as opposed to rejecting the entire table based on only a single or a few invalid rows.

An example of the copy table contents routine 500 in X++ programming is shown below, where the equality criteria columns are Idx1Col1 and Idx1Col2:

```
...
/*** establish schema for table "Table1" (TableId is 1) ***/
ImportTableSchemaInfo schemaInfo =
            new ImportTableSchemaInfo(1);
...
// obtain information about table columns from .DAT file
...
schemaInfo.AddColumnInfo("Col1", 0, 0);
schemaInfo.AddColumnInfo("Col2", 9, 0);
schemaInfo.AddColumnInfo("Idx1Col1", 3, 1, 1, 1);
schemaInfo.AddColumnInfo("Idx1Col2", 9, 1, 1, 2);
schemaInfo.AddColumnInfo("RefRecId1", 9, 2);
schemaInfo.AddColumnInfo("TableId1", 9, 3);
...
// obtain information about RefRecId columns and corresponding
// TableId columns. If TableId column does not exist in the
// imported table, generate a unique name that is going to be
// used as a name of pseudo-column to pass TableId data.
...
schemaInfo.AddColumnMapping("RefRecIdCol1",
    "TableId1"); // real col.
schemaInfo.AddColumnMapping("RefRecIdCol2",
    "C056926AF"); // pseudo col.
...
DataImportManager::EndTableSchemaCopy(schemaInfo);
...
/*** copy data for table "Table1" (TableId is 1) ***/
ImportTableDataInfo dataInfo = new ImportTableDataInfo(1);
...
dataInfo.AddColumnData("Col1", "some data");
dataInfo.AddColumnData("Col2", 1234);
dataInfo.AddColumnData("Col3", dataVar);
...
dataInfo.CopyDataRow( );
...
dataInfo.AddColumnData("Col1", "some other data");
dataInfo.AddColumnData("Col2", 4321);
dataInfo.AddColumnData("Col3", dataVarTwo);
...
dataInfo.CopyDataRow( );
...
DataImportManager::EndTableDataCopy(dataInfo);
```

Although the copy table contents routine 500 describes steps performed by the import process application, the server system 202 may perform steps corresponding to those provided above. For example, the server system 202 may store the data passed from the application logic in the temporary staging tables. The name of the temporary staging table that corresponds to the imported table may be generated using the column containing the unique prefix used to assign names to a temporary staging table corresponding to the imported table, SysImpExpTablesInfo.TableNamePrefix. The data records in the rows of the imported table may be buffered into batches and copied from the client system 204 to the server system 202 using a remote procedure call or other data transfer protocol. The data records may further be transferred from the server system 202 to the database system 206 using a bulk-copy operation. A single data import operation may include multiple bulk-copy operations when a batch of data is first transferred to the server system 202 and then copies to the database system 206. Once all the data for all imported tables have been copied to the temporary staging tables, data processing and merging may take place.

With reference to the X++ programming example of the copy table contents routine 500 shown above, the server system 202 may perform the following in response to each of the method calls provided therein. For example, in response to ImportTableSchemaInfo::.ctor( ) the server system 202 may save the table identification to a new instance of ImportTableSchemaInfo, and return the instance to the client.

In response to AddColumnInfo( ), the server system 202 may add information about the individual column to the ImportTableSchemaInfo instance. The application calls the AddColumnInfo( ) method for each actual and pseudo-column in the imported table, and each call may specify the name of the column, the data type and distinguish regular columns from columns with special meanings.

In response to AddColumnMapping( ), the server system 202 may add information about which record identification reference column corresponds to which table identification column, including table identification pseudo-columns. The client may make one AddColumnMapping( ) call for each pair of record identification reference and table identification.

In response to EndTableSchemaCopy( ), the server system 202 may call SvrEndTableSchemaCopy( ) which may create a temporary staging table that holds the imported data. The temporary staging table contains all columns from the imported table plus some additional columns. The additional columns may be pseudo-columns that the application code passes to the server system 202 as well as two additional columns: new record identification (e.g., NewRecID) and conflicts (e.g., Conflicts). The SvrEndTableSchemaCopy method may further create temporary staging tables, TableColumns and RefRecIDColMap, and populate them with data from the ImportTableSchemaInfo object.

In response to ImportTableData::.ctor( ), the server system 202 may save the table identification to a new instance of ImportTableDataInfo and return the instance to a client. In response to AddColumnData( ), the server system 202 may bind the data value to the column in an internal copy buffer.

In response to CopyDataRow( ), the server system 202 may check to see is the internal copy buffer contains enough rows to start the copy operation. If not, the CopyDataRow( ) method may merely move to the next row in the copy buffer. Otherwise, CopyDataRow( ) method initiates a call to SrvCopyDataRow( ) which both copies the data from the copy buffer into the server system 202 and further into the temporary staging tables. CopyDataRow( ) may then reset the copy buffer.

In response to EndTableDataCopy( ), the server system 202 may copy the current contents of the copy buffer to the temporary staging tables of the target ERP system and clear all helper structures that were used during the data copy.

Figure 7:
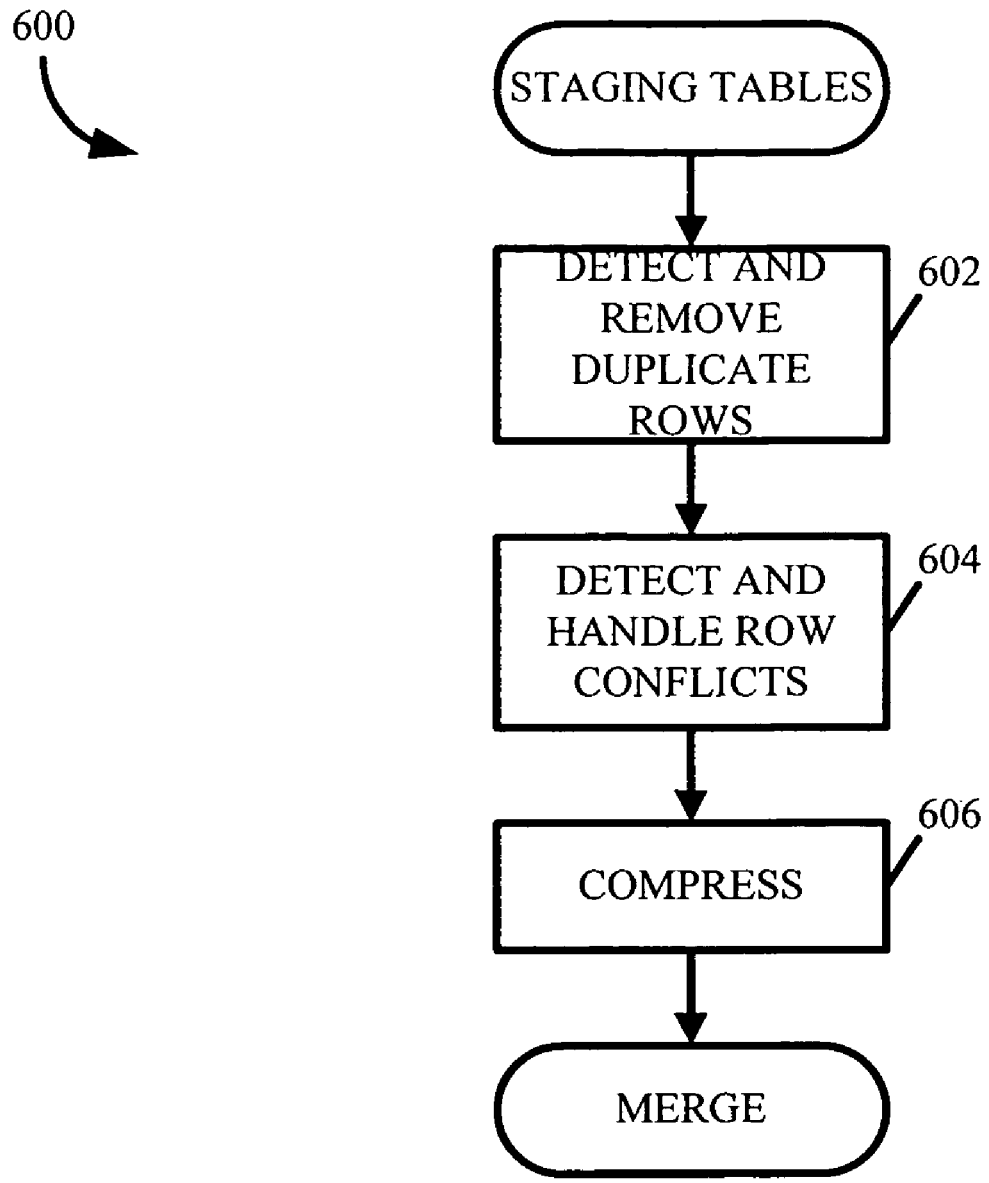
FIG. 7 is a flowchart representative of a routine for processing temporary staging tables.

FIG. 7 is an example of the staging tables processing routine 600 shown schematically in FIG. 4. As mentioned above, the staging tables processing routine 600 may be used to process data in the temporary staging tables, including eliminating duplicate rows in the import set, determining and marking row conflicts, and record identification compression.

In some cases, it is possible that a source table being imported has duplicate rows containing the same data, which may occur if the source ERP system did not have any restrictions on the table regarding duplicate rows. In other words, the imported data itself is invalid or only semi-valid because it contains duplicate rows. Accordingly, it is possible that the target ERP system would not accept the imported data if the target ERP system does have restrictions regarding duplicate rows, in which case the import operation for the entire table may be rejected by the target ERP system.

In order to avoid failure of the set-based import operation due to duplicate rows, the equality criteria columns may be utilized at block 602 to detect and delete duplicate rows. In one example, a DELETE statement may be executed on the temporary staging table to filter out rows that have duplicate values in the equality columns, although other mechanisms for detecting and deleting duplicate rows may be utilized. In particular, equality criteria columns may be compared among data records within the same table being imported. In the comparison, the equality criteria columns may be grouped together to match the grouping of the equality criteria columns in the unique indexes, or other constraints, of the target table. The grouping allows for a correct determination of duplicate records in the staging table. For example, if three columns (e.g., A, B and C) are considered to be equality criteria columns, it is possible these equality criteria columns reflect two unique indexes on the target table (e.g., one unique index on column A and another unique index on columns B and C). If the temporary staging table has two rows that have the same values in column A, but different values in columns B and C, those rows may be considered duplicate rows because they violate the uniqueness of the first index on the target table. However, it is noted that merely comparing all three columns for equality may not detect duplicate rows. As such, the equality criteria columns may be grouped in the comparison criteria according to their grouping in the unique indexes in the target table in order to correctly detect duplicate rows in the temporary staging table. The DELETE statement deletes any duplicate rows from the temporary staging table based on the equivalence of the equality criteria columns, with one of the duplicate rows remaining for further importation. Any duplicate rows that were deleted from the temporary staging table may be reported to a user in an information log after the importation process.

At block 604, the staging tables processing routine 600 may determine whether any conflicting rows exist due to conflicts between data records of the imported table and data records of the target table. In one example, the detection of conflicting rows between an imported table and the target table may be accomplished by an SQL query performing an inner join operation between the imported table and the temporary staging table, and the result of the join operation may be used to update values in the conflicts column of the temporary staging table to mark the conflicting rows within the same query. The join condition may be the equality of the values in columns that constitute row equality criteria for the table. Because the equality criteria columns are known, it can be determined which rows from the imported table conflict with rows from the target table and any conflicting rows may be marked for further processing.

Also at block 604, the staging tables processing routine 600 may handle any row conflicts that may exist. In one example, if an inner join operation was used to detect row conflicts, the result of the join operation may further be used to determine new record identification values for the conflicting rows. For example, if the user option for handling row conflicts, SysImpExpSessionInfo.UpdateConflictingRows, is set to "true," then the new record identification value for the conflicting imported row is the record identification value of the corresponding row in the target table. If the user option is set to "false," then the new record identification value is set to zero, and the row will be rejected by the import process. Accordingly, corresponding record identification reference values may also be set to zero.

An example of an SQL statement for detecting and handling a row conflicts in a temporary staging table (T1_Imp), if the user option, SysImpExpSessionInfo.UpdateConflictingRows, is set to "true" is shown below. Although examples of SQL statements are provided, it should be understood that other database queries/statements may used. In the example shown below, a target table T1 has a unique index on column IdxCol. Although not shown in the example below, the target table may also have a unique index on the record identification column as well as other columns as automatically created by the system, in which case the record identification column may be excluded from the row equality criteria unless there are other indexes on the table that include the record identification column.

```
UPDATE T1_Imp SET
    T1_Imp.NewRecId = T.RecId,
    T1_Imp.Conflicts = 1
FROM (
SELECT
    T1.IdxCol,
    T1.RecId
FROM T1
    INNER JOIN T1_Imp
        ON T1.IdxCol = T1_Imp.IdxCol
) AS T
WHERE T1_Imp.IdxCol = T.IdxCol
```

An example of an SQL statement for detecting and handling row conflicts in a temporary staging table, if the user option, SysImpExpSessionInfo.UpdateConflictingRows, is set to "false" is shown below. In the following example, the update statement marks conflicting rows and updates corresponding record identification values in the corresponding temporary staging table, T1_Imp.

```
UPDATE T1_Imp SET
    T1_Imp.NewRecId = 0,
    T1_Imp.Conflicts = 1
FROM (
SELECT T1.IdxCol
    FROM T1
        INNER JOIN T1_Imp
            ON T1.IdxCol = T1_Imp.IdxCol
) AS T
WHERE T1_Imp.IdxCol = T.IdxCol
```

The above examples, demonstrate a simple case of using row equality criteria when there is only one column that constitutes row equality criteria for a data record. However, for more complex cases containing multiple equality criteria columns, the join conditions may be constructed by taking separate indexes and column order into account.

After handling any conflicting rows at block 604, or if no row conflicts exist, the staging tables processing routine 600 may compress the record identification values from the imported table to convert a range of fragmented, non-contiguous record identification values that may conflict with the target record identifications values into a range of contiguous record identification values that do not conflict with the target record identification values at block 606. For example, once all conflicting rows have been determined, it may be known how many rows from the imported table will be appended to the target table in the target ERP system (e.g., all non-conflicting rows). At block 606, a range of record identification values within the target table may be reserved, where the range of record identification values is equal to the amount of non-conflicting rows in the import table. Once the range is reserved, the processing routine 600 may perform a record identification value compression on the non-conflicting rows of the imported table. In one example, record identification compression may be achieved by creating an additional temporary mapping table, CompressionMap, having a column for the old record identification values, OldRecID, and a column for the new record identification values, NewRecID. An identity property may be a special property of the column which automatically assigns values as rows are inserted into the table. The NewRecID column of the imported table may be created as an IDENTITY column and may be initialized with the first record identification value from the reserved record identification value range. The assignment of new record identification values using a reserved record identification value range equivalent to the number of non-conflicting rows allows data records to be added to the target ERP system without overlapping or conflicting record identification values.

An example of an SQL script demonstrating record identification compression logic for a temporary staging table, T1_Imp, is shown below. The SQL script assumes that the first record identification value from the reserved range has a value of 11.

```
CREATE TABLE T1_Compr(
    OldRecId      int,
    NewRecId   int IDENTITY(11, 1)
)
INSERT INTO T1_Compr(OldRecId)
SELECT RecId
    FROM T1_Imp
    WHERE Conflicts = 0
-- Compress non-conflicting RecIds in the T1
UPDATE T1_Imp SET
    T1_Imp.NewRecId = T.NewRecId
FROM (
    SELECT T1_Compr.NewRecId, T1_Compr.OldRecId
        FROM T1_Compr
            INNER JOIN T1_Imp
                ON T1_Compr.OldRecId = T1_Imp.RecId
) AS T
WHERE T1_Imp.RecId = T.OldRecId
-- Drop table T1_Compr
DROP TABLE T1_Compr
```

For large tables, optimizations may be provided to reduce the time it takes to update new record identification values in the temporary staging table from the CompressionMap table. For example, instead of creating a CompressionMap table with two columns (OldRecId and NewRecId), the table may be created having the same schema as the temporary staging table (which also contains old record identification and new record identification columns) and a new record identification column may be provided as an identity column, shown in the above example as IDENTITY. Afterwards, data from the temporary staging table may be copied into the CompressionMap table to assign new record identification values to the records of the temporary staging table, and instead of updating the new record identification values in the temporary staging table from the CompressionMap table, the temporary staging table may be dropped and the CompresseionMap table may be re-named as the temporary staging table. As such, this operation may save time for the update operation on large tables.

Figure 8:
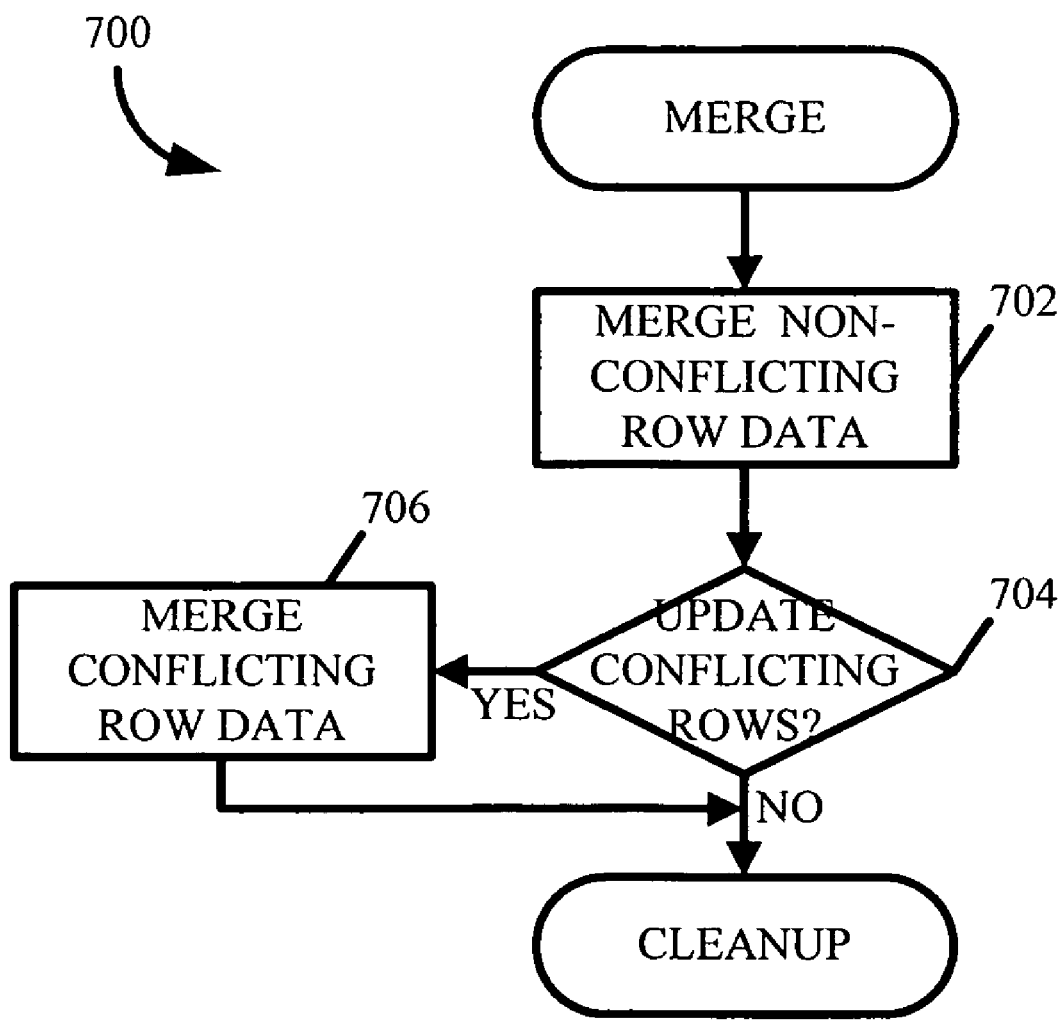
FIG. 8 is a flowchart representative of a routine for purging data from temporary staging tables to the target table within the target database.

FIG. 8 is an example of the merge data routine 700 shown schematically in FIG. 4. As mentioned above; the merge data routine 700 may be used to merge (e.g., copy, move, append or update) data from the temporary staging table into the target table. As also mentioned, the merge data routine 700 may be dependent upon the user option for handling row conflicts, SysImpExpSessionInfo.UpdateConflictingRows. Because new record identification values have been assigned to some or all of the data records within all imported tables due to record identification transformation, the record identification reference values of an imported table still refer to the now-obsolete old record identification values of other tables. In order to preserve the relationship between the record identification reference values and the new record identification values, the record identification reference values for non-conflicting rows may be updated at block 702 with the new record identification values along with updating the corresponding rows in the target table. The import process may move data for all non-conflicting rows within the imported table to the target table using one or more SQL queries, examples of which are provided below.

The merge data operation of block 702 to update the record identification reference values and to update the data of the target table with the data from the temporary staging table may be achieved with one SQL query per temporary staging table. In particular, the move data operation and record identification reference update operation for a temporary staging table may be performed with one SQL query regardless of the number of record identification reference columns in the temporary staging table and regardless of the number of tables being referred to within the record identification reference column(s). For example, the following four scenarios may be considered: (1) a table having one record identification reference column that refers to record identification values in only one other table; (2) a table having multiple record identification reference columns, where each column may refer to record identification values in only one other table; (3) a table having one record identification reference column that refers to reference identification values in multiple tables; and (4) a table having any number of record identification reference columns, where each column may refer to record identification values of data records in multiple tables.

For a table having one record identification reference column referring to record identification values in only one table, the SQL query may include a join operation between a temporary staging table having the record identification reference column and another temporary staging table having record identification column to which the record identification reference column refers. The result of the join operation may be provided to the target table in the ERP system.

An example of such an SQL query is provided below. In the example below, the join operation is an outer join operation, and more particularly a left outer join, as opposed to an inner join in order to set any record identification reference values which refer to data records that no longer exist to a value (e.g., "0") indicating an invalid reference. An imported table, TRef, contains a record identification reference column, RefRecId, that refers to a record identification column, RecId, in a second table, T1. A temporary staging table, TRef_Imp, corresponding to the imported table, TRef, includes the record identification reference column RefRecId. Likewise, a temporary staging table, T1_Imp has a record identification column RecId to which the TRed_Imp.RefRecId column refers. Although the example provided below indicates only two columns in the imported table (RecId and RefRecId), the imported table may have additional columns, in which case it should be understood that the SQL query may be modified with appropriate expressions for the additional columns.

```
INSERT INTO TRef(RecId, RefRecId)
SELECT TRef_Imp.NewRecId,
    IsNull(T1_Imp.NewRecId, 0)
FROM TRef_Imp
  LEFT OUTER JOIN T1_Imp
    ON TRef_Imp.RefRecId = T1_Imp.RecId
  WHERE TRef_Imp.Conflicts = 0
```

For an imported table having multiple record identification reference columns, each referring to record identification values in one table, the SQL query includes a join operation for each record identification reference column, RefRecID1 and RefRecID2, in the imported table, TRef. Again, it should be understood that the SQL query may be modified with appropriate expressions for additional columns.

```
INSERT INTO TRef(RecId, RefRecId1, RefRecId2, ...)
SELECT TRef_Imp.NewRecId,
    IsNull(T1_Imp.NewRecId, 0),
    IsNull(T2_Imp.NewRecId, 0),
    ...
FROM TRef_Imp
  LEFT OUTER JOIN T1_Imp
    ON TRef_Imp.RefRecId1 = T1_Imp.RecId
  LEFT OUTER JOIN T2_Imp
    ON TRef_Imp.RefRecId2 = T2_Imp.RecId
  ...
WHERE TRef_Imp.Conflicts = 0
```

For an imported table having a record identification reference column referring to multiple tables, record identification reference values within the column that refer to the same table may be logically treated as separate columns that will be merged together once they are processed separately. Accordingly, the SQL query may include a join operation for each set of record identification reference values referring to the same table (i.e., a join operation for each table being referred to). In the example below, the imported table, TRef, has a record identification reference column, RefRecID, that refers to a set of multiple tables, T1, T2, T3. The SQL query updates all values in the record identification reference column and merges the data into the target table, TRef. The Coalesce( ) SQL function picks the first non-null record identification value from the temporary staging tables, T1_Imp, T2_Imp, T3_Imp, corresponding to the set of tables T1, T2, T3. Additional columns may be accounted for by modifying the SQL query with appropriate expressions.

```
INSERT INTO TRef(RecId, RefRecId)
SELECT TRef_Imp.NewRecId,
    IsNull(Coalesce(T1_Imp.NewRecId,
        T2_Imp.NewRecId,
        T3_Imp.NewRecId,
        ...
    ), 0)
FROM TRef_Imp
  LEFT OUTER JOIN T1_Imp
```

-continued

```
        ON TRef_Imp.RefRecId = T1_Imp.RecId
           AND TRef_Imp.RefRecId_TableId = T1TableId
     LEFT OUTER JOIN T2_Imp
        ON TRef_Imp.RefRecId = T2_Imp.RecId
           AND TRef.RefRecId_TableId = T2TableId
     LEFT OUTER JOIN T3_Imp
        ON TRef_Imp.RefRecId = T3_Imp.RecId
           AND TRef.RefRecId_TableId = T2TableId
     ...
     WHERE TRef_Imp.Conflicts = 0
```

For an imported table having any number of record identification reference columns, where each may refer to any number of tables, the SQL query includes a join operation for each record identification reference column and a join operation for each table being referred to within a record identification reference column. In the example below, the imported table, TRef, includes record identification reference column, RefRecID1, which refers to tables T11, T12 and T13, record identification reference column, RefRecID2, which refers to tables T21, T22 and T23, and record identification reference column, RefRecID3, which refers to tables T31, T32, T33. Additional columns may be accounted for by modifying the SQL query with appropriate expressions.

```
INSERT INTO TRef(RecId, RefRecId1, RefRecId2, . . .)
SELECT TRef_Imp.NewRecId,
     IsNull(Coalesce(T11_Imp.NewRecId,
            T12_Imp.NewRecId,
            T13_Imp.NewRecId,
            ...
            ), 0),
     IsNull(Coalesce(T21_Imp.NewRecId,
            T22_Imp.NewRecId,
            T23_Imp.NewRecId,
            ...
            ), 0),
     IsNull(Coalesce(T31_Imp.NewRecId,
            T32_Imp.NewRecId,
            T33_Imp.NewRecId,
            ...
            ), 0),
     ...
  FROM TRef_Imp
   LEFT OUTER JOIN T11_Imp
     ON TRef_Imp.RefRecId1 = T11_Imp.RecId
        AND TRef_Imp.RefRecId1_TableId = T11TableId
   LEFT OUTER JOIN T12_Imp
     ON TRef_Imp.RefRecId1 = T12_Imp.RecId
        AND TRef_Imp.RefRecId1_TableId = T12TableId
   ...
   LEFT OUTER JOIN T21_Imp
     ON TRef_Imp.RefRecId2 = T21_Imp.RecId
        AND TRef_Imp.RefRecId2_TableId = T21TableId
   LEFT OUTER JOIN T22_Imp
     ON TRef_Imp.RefRecId2 = T22_Imp.RecId
        AND TRef_Imp.RefRecId2_TableId = T22TableId
   ...
   LEFT OUTER JOIN T31_Imp
     ON TRef_Imp.RefRecId3 = T31_Imp.RecId
        AND TRef_Imp.RefRecId3_TableId = T31TableId
   LEFT OUTER JOIN T32_Imp
     ON TRef_Imp.RefRecId3 = T32_Imp.RecId
        AND TRef_Imp.RefRecId3_TableId = T32TableId
   ...
   WHERE TRef_Imp.Conflicts = 0
```

In the above examples, the record identification reference columns may be modified to match the transformations of the record identification values being referred to as part of merging the data into a target table. For other columns from the import set, record identification values may be provided from the new record identification column rather than the record identification column of the temporary staging table. Pseudo-columns and conflicts columns from the temporary staging table may not be copied to the target table. The remaining columns may be copied "as is" without further transformations.

Further, the above query examples may be provided as multiple queries if the number of joins in the query become too numerous. For example, if the record identification reference column refers to many other tables, the number of joins in the query may be large and the query may run for a long time. As such, the query may be broken down into multiple queries each with a lesser amount of joins in order to improve the overall query performance, in which case a threshold may be introduced into the query generating code, such that if the query has more than a predetermined number of joins the query may be broken down into smaller pieces.

At block 704, the merge data routine 700 may determine whether or not to update any conflicting rows based upon the user option regarding the rejection or update of conflicting rows. If user chooses during the set up data routine 400 to ignore conflicting rows (e.g., if SysImpExpSessionInfo.UpdateConflictingRows, is set to "false"), then the data of conflicting rows is not used to update corresponding rows in the target tables, the record identification columns for conflicting rows will not be updated and the record identification reference columns that were referring to the conflicting rows may be set to zero to indicate an invalid relationship.

If the user option was to update rows of a target table with data from conflicting rows (e.g., SysImpExpSessionInfo.UpdateConflictingRows, is set to "true"), then the update may be performed in a set-based operation for non-conflicting rows and a separate set-based import operation for conflicting rows. If the conflicting rows have equality criteria columns, then all columns in the corresponding row of the target table are updated with the imported data, except for the equality criteria columns. As explained above, equality criteria columns may be used to determine if a row from an imported table already exists in the target ERP system.

In order to update data within conflicting rows, a similar update query may be constructed, except the record identification column and the equality criteria column are not updated, and data within the pseudo-columns of the temporary staging table are ignored. An example of an SQL update query is provided below for an imported table, TRef, having any number of record identification reference columns, each of which may refer to any number of tables. Columns IdxCol1, IdxCol2, . . . are row equality criteria columns for the imported table, TRef.

```
UPDATE TRef SET
     TRef.RefRecId1 = T.RefRecId1,
     TRef.RefRecId2 = T.RefRecId2,
     ...
  FROM (
  SELECT     TRef_Imp.IdxCol,
     IsNull(Coalesce(T11_Imp.NewRecId,
            T12_Imp.NewRecId,
            T13_Imp.NewRecId,
            ...
            ), 0),
     IsNull(Coalesce(T21_Imp.NewRecId,
            T22_Imp.NewRecId,
            T23_Imp.NewRecId,
            ...
            ), 0),
```

-continued

```
    ...
    FROM TRef_Imp
      LEFT OUTER JOIN T11_Imp
        ON TRef_Imp.RefRecId1 = T11_Imp.RecId
        AND TRef_Imp.RefRecId1_TableId = T11TableId
      LEFT OUTER JOIN T12_Imp
        ON TRef_Imp.RefRecId1 = T12_Imp.RecId
        AND TRef_Imp.RefRecId1_TableId = T12TableId
    ...
      LEFT OUTER JOIN T21_Imp
        ON TRef_Imp.RefRecId2 = T21_Imp.RecId
        AND TRef_Imp.RefRecId2_TableId = T21TableId
      LEFT OUTER JOIN T22_Imp
        ON TRef_Imp.RefRecId2 = T22_Imp.RecId
        AND TRef_Imp.RefRecId2_TableId = T22TableId
    ...
    WHERE TRef_Imp.Conflicts = 1
  ) AS T
  WHERE TRef.IdxCol1 = T.IdxCol1 AND
        TRef.IdxCol2 = T.IdxCol2 AND
    ...
```

Accordingly, with the merge data routine 700 non-conflicting rows are inserted from the temporary staging table to the target table in a set-based operation, and conflicting rows are updated to the target table in another set-based operation. As a result, source tables may be imported to target tables in a set-based manner that imports the entire contents of a source table in just one or two relational database queries, rather than on a row-by-row basis. Further, relationships between data records and tables may be preserved by updating record identification reference values of a table within the same relational database query similar to those described above. This process may be performed for each temporary staging table.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of importing data in an enterprise resource planning system from a source table in a first system to a target table in a second system comprising:

receiving data records organized within rows of a first table, wherein the first table comprises a plurality of rows and a plurality of columns including a first record identification reference column comprising one or more record identification references, wherein each data record is stored within a row of the first table and organized among the columns of the first table, and a record identification reference of the first record identification reference column relates a first data record in an associated row of the first table with a record identification of a second data record in the first system;

copying the row contents of the first table to a first temporary staging table;

organizing the second data record within a row of a second temporary staging table having a record identification column comprising one or more record identifications uniquely identifying each data record of the second staging table within the target system;

assigning a new record identification to the second data record during importation of the second data record to the target system; and executing a database query on the entire first table to merge the data records of the first table with a first target table within a target system, wherein executing the database query to merge the data records comprises:

merging row contents of the first temporary staging table with the first target table; and executing a join statement between the first record identification reference column of the first temporary staging table and the reference identification column of the second temporary staging table, wherein the first record identification reference column comprises record identifications of the data records of the second table and the record identification column of the second temporary staging table comprises the new record identifications of the data records of the second temporary staging table; and relating the updated record identification reference of the first data record of the first target table with the new record identification of the second data record.

2. The method of claim 1, wherein the join statement comprises a structured query language (SQL) outer join statement.

3. The method of claim 1, wherein each record identification reference of the first record identification reference column relates a data record of the first table with a record identification of a data record of a second table within the source system, wherein updating each record identification reference of the first table during the relational system query comprises:

updating each record identification reference of the first table to relate the corresponding data record of the first table with a new record identification of a data record of a second target table, wherein the second target table corresponds to an importation of the second table to the target system and at least one record identification of the second table is replaced with a new record identification during importation of the second table to the target system.

4. The method of claim 1, wherein the first record identification column comprises a record identification reference relating a data record of the first table with a record identification of a data record of a second table and a record identification reference relating a data record of the first table with a record identification of a data record of a third table, wherein updating each record identification reference of the first table during the database query comprises:

updating each record identification reference of the first table that relates to a record identification of a data record of the second table to relate the corresponding data record of the first table with a new record identification of a data record of a second target table; and updating each record identification reference of the first table that relates to a record identification of a data record of the third table to relate the corresponding data record of the first table with a new record identification of a data record of a third target table, wherein the second target table corresponds to an importation of the second table to the target system and at least one record identification of a data record of the second table is replaced with a new record identification during importation of the second table to the target system, and wherein the third target table corresponds to an importation of the third table to the target system and at least one record identification of a data record of the third table is replaced with a new record identification during importation of the third table to the target system.

5. The method of claim 1, wherein a record identification reference of the first record identification reference column relates a data record of the first table with a record identification of a data record of a second table within the source system;

wherein the first table further comprises a second record identification reference column comprising one or more record identification references, wherein a record identification reference of the second record identification reference column relates a data record of the first table with a record identification of a data record of a third table within the source system;

wherein updating each record identification reference of the first table during the database query comprises:

updating each record identification reference of the first record identification reference column to relate the corresponding data record of the first table with a new record identification of a data record of a second target table; and updating each record identification reference of the second record identification reference column to relate the corresponding data record of the first table with a new record identification of a data record of a third target table, wherein the second target table corresponds to an importation of the second table to the target system and at least one record identification of a data record of the second table is replaced with a new record identification during importation of the second table to the target system, and wherein the third target table corresponds to an importation of the third table to the target system and at least one record identification of a data record of the third table is replaced with a new record identification during importation of the third table to the target system.

6. The method of claim 1, wherein the first table and the first target table each comprise an equality criteria column and a record identification column, wherein values of the equality criteria column and values of the record identification column of the first table uniquely identify each imported data record and values of the equality criteria column and values of the record identification column of the first target table uniquely identify each data record within the target system, the method further comprising:

comparing the values of the equality criteria columns of the first table and the first target table to determine conflicting data records, wherein matching values comprise a conflicting record; and merging data records of the first table with the first target table during the database query comprises merging data records of the first table with the first target table which do not comprise conflicting data records.

7. The method of claim 6, wherein merging data records of the first table with the first target table during the database query further comprises:

merging all columns except the equality criteria columns of data records of the first table with the first target table which comprise conflicting data records; and assigning a new record identification to each conflicting data record of the first table, wherein the new record identification comprises the record identification of the corresponding conflicting data record of the first target table.

8. The method of claim 6, wherein comparing the values of the equality criteris columns comprises executing a join statement between the equality criteria columns of the first table and the first target table.

9. The method of claim 8, wherein the join statement comprises a structured query language (SQL) inner join statement.

10. The method of claim 1, wherein the first table and the first target table each comprise an equality criteria column and a record identification column, wherein values of the equality criteria column and values of the record identification column of the first table uniquely identify each imported data record and values of the equality criteria column and values of the record identification column of the first target table uniquely identify each data record within the target system, the method further comprising:

comparing the values of the equality criteria columns of the first table and the first target table to determine conflicting data records, wherein matching values comprise a conflicting record; and assigning a new record identification to each data record of the first table which does not comprise conflicting data records, wherein the new record identification is assigned from a range of consecutive record identification values and each new record identification uniquely identifies the data record of the first target table within the target system.

11. The method of claim 1, further comprising:

copying the row contents of the first table to a first temporary staging table, wherein the first temporary staging table comprises a table schema of the target table having one or more table constraints regarding the contents of the target table; and rejecting a data record comprising data that violates the table constraints.

12. The method of claim 1, further comprising:

comparing data values within a first column of two or more rows of the first table;

comparing data values within a second column of the two or more rows of the first table; and rejecting at least one of the two or more rows if the data values of the two or more rows of the first column match and if the data values of the two or more rows of the second column match.

13. A computer-readable storage medium having computer-executable instructions for preserving relationships between data records of a first table and data records of a second table in a source system during importation of the first and second tables from the source system to a target system, the computer executable instructions comprising instructions for:

copying data records of the first table to a first temporary staging table, wherein the first table and first temporary staging table each comprise a plurality of rows and a plurality of columns including a first record identification reference column comprising one or more record identification references, wherein each data record is stored in the source system within a row of the first table and organized among the columns of the first table, and a record identification reference of the first record identification reference column relates a first data record in an associated row of the first table with a record identification of a second data record in the second table in the source system;

copying data records of the second table to a second temporary staging table;

assigning new record identifications to the data records of the second temporary staging table, wherein each new record identification uniquely identifies the data record of the second table within the target system; and performing a join operation between a first record identification reference column of the first temporary staging table and a record identification column of the second temporary staging table, wherein the first record identification reference column comprises record identifications of the data records of the second table and the record identification column of the second temporary staging table comprises the new record identifications of the data records of the second temporary staging table.

14. The computer-readable storage medium having computer-executable instructions of claim 13, wherein the join operation comprises an outer join operation.

15. The computer-readable storage medium having computer-executable instructions of claim 13, wherein the first record identification reference column comprises one or more record identifications of data records of the second table and one or more record identifications of data records of a third table, the computer executable instructions further comprising instructions for:

copying data records of the third table to a third temporary staging table;

assigning new record identifications to the data records of the third temporary staging table, wherein each new record identification uniquely identifies the data record within the target system;

performing a join operation between the first record identification reference column of the first temporary staging table and a record identification column of the third temporary staging table, wherein the record identification column of the third temporary staging table comprises the new record identifications of the data records of the third temporary staging table.

16. The computer-readable storage medium having computer-executable instructions of claim 13, the computer executable instructions further comprising instructions for:

copying data records of a third table to a third temporary staging table;

assigning new record identifications to the data records of the third temporary staging table, wherein each new record identification uniquely identifies the data record within the target system;

performing a join operation between a second record identification reference column of the first temporary staging table and a record identification column of the third temporary staging table, wherein the second record identification reference column comprises record identifications of the data records of the third table and the record identification column of the third temporary staging table comprises the new record identifications of the data records of the third temporary staging table.

17. The computer-readable storage medium having computer-executable instructions of claim 13, wherein the first temporary staging table comprises a plurality of equality criteria columns within the first temporary staging table, the computer executable instructions further comprising instructions for:

comparing the values of two or more of the plurality of equality criteria columns; and deleting at least one of the two or more data records if the values of the two or more equality criteria columns match.

18. A computer adapted for importing data records of a source table within a source system to a target table within a target system, wherein each data record is organized within a row of the source table, the computer comprising:

a network communication device for receiving data via a network;

a memory storing machine-readable instructions; and a processor for executing the machine-readable instructions performing a method comprising:

copying the rows of the source table to a temporary staging table, wherein each row of the source table comprises a record identification value uniquely identifying each data record within the source system, and a column of the source table comprises a record identification reference column includes one or more record identification reference values, wherein each data record is stored in the source system within a row of the source table and organized among columns of the source table, and a record identification reference value of the record identification reference column relates a first data record in an associated row of the source table with a record identification of a second data record in another table in the source system;

executing a structured query language (SQL) inner join statement between an equality criteria column of the temporary staging table and an equality criteria column of the target table to determine conflicts between data records of the temporary staging table and data records of the target table, wherein the equality criteria column of the temporary staging table comprises values uniquely identifying each data record within the source system and the unique identity column of the target table comprises values uniquely identifying each data record within the target system;

executing a structured query language (SQL) inner join statement between a record identification column of the temporary staging table comprising record identification values from the source system and a record identification column comprising new record identification values for the target system;

executing a structured query language (SQL) outer join statement between a record identification reference column of the temporary staging table comprising record identification values of the other table in the source system and a record identification column of another temporary staging table comprising new record identification values for the target system, wherein the other temporary staging table corresponds to the other table from the source system.

19. The computer of claim 18, wherein the memory stores instructions for performing the method further comprising:

executing a structured query language (SQL) outer join statement between a first row of a first column of the temporary staging table and a second row of the first column of the temporary staging table to determine the equivalency of values between the first row and the second row within the first column; and executing a structured query language (SQL) outer join statement between the first row of a second column of the temporary staging table and the second row of the second column of the temporary staging table to determine the equivalency of values between the first row and the second row within the second column; and executing a structured query language (SQL) delete statement to delete the first row if the values between the first row and the second row within the first column match and if the values between the first row and the second row within the second column match.

* * * * *